United States Patent
Joslin

[11] 3,816,272
[45] June 11, 1974

[54] ECM TREATMENT OF SMALL HOLES

[76] Inventor: Frederick R. Joslin, Rt. 207, Lebanon, Conn. 06249

[22] Filed: Aug. 4, 1972

[21] Appl. No.: 278,136

[52] U.S. Cl. .......................... 204/129.1, 204/129.35
[51] Int. Cl. ............................................... B23p 1/20
[58] Field of Search .................... 204/129.1, 129.35

[56] References Cited
UNITED STATES PATENTS
3,723,268  3/1973  Johns et al. ...................... 204/129.1

OTHER PUBLICATIONS
Practice and Theory of Electrochemical Machining by Wilson, pp. 156, 157, 159, pub. by Wiley, New York, 1971.

Primary Examiner—F. C. Edmundson
Attorney, Agent, or Firm—Charles A. Warren

[57] ABSTRACT

The recast surface layer on a laser-drilled hole is removed by an ECM technique that involves positioning an electrode in the hole and flowing an electrolyte through the hole and around the electrode in a direction toward the large end of the taper.

2 Claims, 5 Drawing Figures

3,816,272

ECM TREATMENT OF SMALL HOLES

SUMMARY OF THE INVENTION

In drilling small holes especially in high temperature superalloys which are very difficult to machine, the holes may be made by such devices as electron beam or laser. In either event the finished surface of the hole made in this way has a recast surface that is not smooth, the hole is not round and the hole generally has a significant taper from end to end. In almost all cases it is desirable that the hole should be generally round, that the recast layer be removed, that the hole should have a consistent configuration from end to end and that it have an appropriate radius of curvature at opposite ends where it blends with the surfaces of the workpiece in which the hole is positioned.

One of the principal features of this invention is an arrangement for removing the recast layer and additional material from the workpiece to provide a hole of the desired consideration for its entire length. Another feature is the use of electrochemical milling for the purpose of removing the recast layer and providing a round hole with the appropriate configuration from end to end.

DETAILED DESCRIPTION OF THE PREFERRED EMBODIMENT

Figure 2:
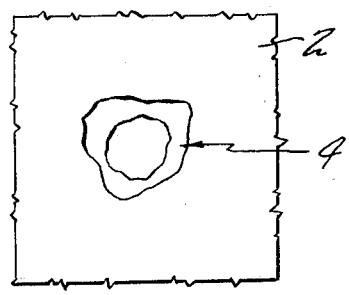
FIG. 2 is a plan view of the hole.
Figure 1:
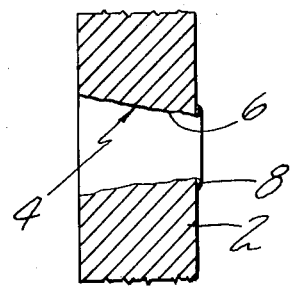
FIG. 1 shows a greatly enlarged sectional view through a workpiece showing a hole therein made by a laser technique.

Referring first to FIGS. 1 and 2, the workpiece 2 is shown with a hole 4 therein made either by electron beam or more routinely by the use of a laser. The resulting hole has a recast layer 6 of a different granular structure from that of the workpiece itself and there may be an overflow of material referred to as expulsion 8 on the side of the hole opposite to the source of the laser beam. The hole 4 is tapered as shown and is irregular in shape through the length thereof and at both ends so that the resulting hole is by no means a smooth-surfaced hole or a regularly shaped hole.

It will be noted that the invention is particularly concerned with small diameter holes and with relatively small material thickness. For example, the showing of FIGS. 1 and 2 is greatly enlarged since the material in question is .015 inches in thickness, the hole at the smaller end is about .010 inches and the smaller dimension of the hole at the larger end is .013 and varies from that to dimension 0.017 inches.

In making the original hole as shown in FIG. 1, the laser used was a ruby laser, in a one shot operation on a wavelength of 0.6943 microns. The laser energy was from 5 to 10 joules and the beam was of one millisecond duration. The focus of the laser was 0.005 inches below the exit surface of the part. The material in question was a high temperature material known as Inco 718 or as AMS 5596. The recast layer varied in thickness up to 0.002 inches.

The recast material left on the surface of the hole is relatively brittle and tends to be the source of cracking that may occur in the workpiece itself. It is particularly desirable to remove this recast surface before the workpiece is utilized. Furthermore, it is most essential that the diameter of the hole and that the configuration of the hole from end to end be less irregular. It is desirable to have a radius of curvature at both ends of the hole where it blends with the surfaces of the workpiece and it is in most cases desirable that there be no or only a slight taper in the workpiece from end to end.

Figure 3:
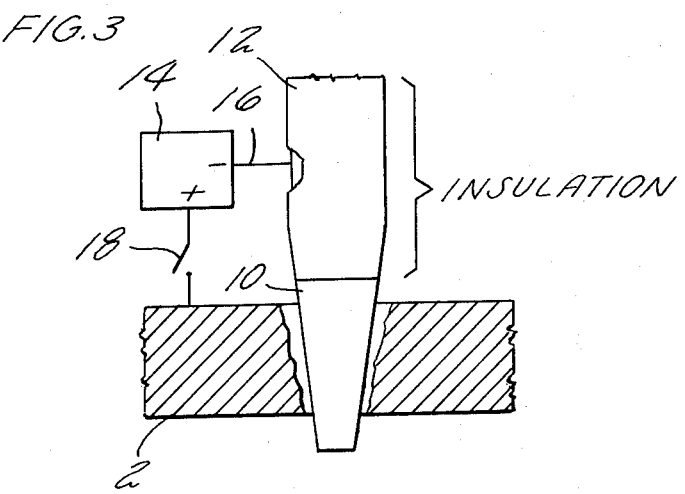
FIG. 3 is a sectional view similar to FIG. 1 and showing the electrode in a position therein for electrochemically milling the hole to the desired configuration.

To accomplish the reshaping of the hole, a device as in FIG. 3 is utilized. A solid cathode (electrode) 10 having a layer of insulation 12 thereon is positioned in the hole. The portion of the electrode received within the hole is free of insulation and is tapered. In the particular arrangement shown the cathode is a tungsten wire having a diameter of 0.013 inches and the insulation applied thereto has a thickness of 0.002 inches. The cathode is tapered where it is positioned within the hole in the workpiece and the taper on the particular electrode shown goes from a small end diameter of 0.005 inches to the full diameter of the wire and insulation at a distance of 0.030 inches from the small diameter tip. The taper on the electrode conforms somewhat generally to the taper on the hole as made by the laser beam and the electrode is placed in fixed relation to the workpiece as shown in FIG. 3.

There is no feeding of the electrode into the work during electrochemical machining operation. It should further be noted that the longitudinal axis of the cathode is placed within the hole on the desired axis of the finished hole since the function of the cathode is to remove the surface material from the hole of the workpiece. If the cathode is not centrally located within the hole, the portion of the surface of the hole closest to the electrode will be removed first and the resulting hole will ultimately be concentric to the axis of the workpiece and to the periphery of the operative surface of the electrode.

After an electrical potential is placed between the electrode and the work as through a source of electricity represented by the box 14, the latter having its two terminals 16 connected respectively to the electrode and to the workpiece with a switch 18 in one of the leads for controlling the supply of electricity. When the electrical potential of the proper polarity has been applied, electrolyte is flowed through the annulus between the surface of the hole and the electrode and preferably in a direction toward the large diameter of the electrode. That is to say, the flow of electrolyte would be upward in the showing of FIG. 3.

Figure 5:
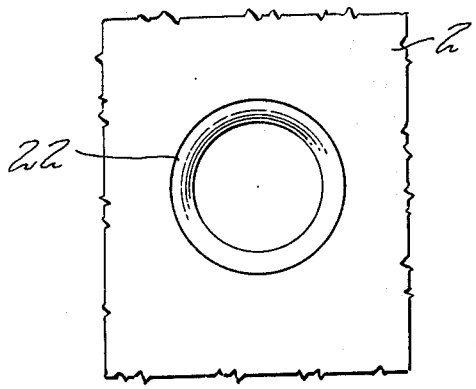
FIG. 5 is a plan view of the hole of FIG. 4.
Figure 4:
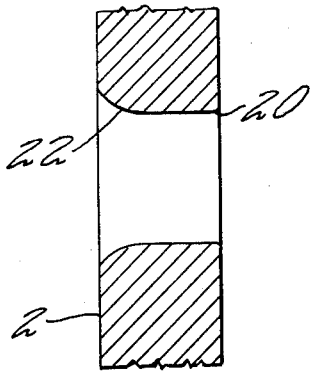
FIG. 4 is a sectional view through the finished hole made by the technique of the present invention with the workpiece on the same scale as FIG. 1.

The effect of current passing thru the electrolyte is to cause an electrochemical milling operation which removes the recast layer and additional material from the surface of the hole and produces a hole much the shape of that shown in FIGS. 4 and 5. In the particular arrangement shown the electrolyte used was sodium chloride, 2.25 pounds per gallon, with added sodium hydroxide to a pH of approximately 10 and with the electrolyte supplied under a pressure of about 80 psi. The electrical potential applied in the particular environment was 5.5 volts with an amperage of 0.090 and the duration of the electrochemical milling operation was 10 seconds. The result was a finished hole having a diameter of 0.018 inches from end to end and with a small diameter radius of curvature 20 at the underside and a larger radius of curvature 22 at the end of the hole where the larger end of the electrode was positioned. These radii of curvature are extremely consistent and the diameter of the hole is either entirely straight or it may have a very slight taper therein. If the hole has a consistently slightly tapered surface, this can be overcome by a very small increase in the small diameter of the cathode so that there is a slightly less taper in the electrode. Thus, by the electrochemical milling of the hole formed by a laser beam, the out of roundness has been eliminated, the recast layer and the expulsion have been removed, consistent exit and entrance radii have been produced and the desired configuration of the hole between opposite ends has been obtained.

I claim:

1. In the removal of the recast material on the surface of a laser-drilled hole in a workpiece, the recast material having a different granular structure from the underlying material of the workpiece and an irregular surface, the steps of positioning a smooth-surfaced tapered electrode in said hole out of contact with the surface of the hole and in fixed relation thereto, applying an electrical potential between the workpiece and the electrode, and flowing an electrolyte through said hole past said electrode in the direction of the increasing dimension of the electrode for the removal of the surface material on the hole.

2. In the removal of the recast irregular surface on a laser-drilled hole in a workpiece, the recast material having an undesirable granular structure and in the formation of a smooth regular substantially cylindrical hole therein, the steps of positioning a solid electrode in fixed position in said hole with the axis of the electrode coincident with the desired axis of the finished hole and with the electrode out of contact with the workpiece, applying an electrical potential between the electrode and the workpiece, and causing a flow of electrolyte through said hole in the space between the recast surface and the electrode in the same direction as the increasing diameter of the electrode for the electrochemical removal of the recast surface and additional material of the workpiece to produce a substantially cylindrical surface concentric to the periphery of the electrode.

* * * * *